(12) United States Patent
Ito

(10) Patent No.: US 11,203,290 B2
(45) Date of Patent: Dec. 21, 2021

(54) VEHICLE ILLUMINATION SYSTEM

(71) Applicant: Toyota Jidosha Kabushiki Kaisha, Toyota (JP)

(72) Inventor: Masaki Ito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 16/667,080

(22) Filed: Oct. 29, 2019

(65) Prior Publication Data

US 2020/0130573 A1  Apr. 30, 2020

(30) Foreign Application Priority Data

Oct. 31, 2018 (JP) .............................. JP2018-205670

(51) Int. Cl.
*B60Q 3/80* (2017.01)
*B60Q 3/74* (2017.01)
(Continued)

(52) U.S. Cl.
CPC ............... *B60Q 3/80* (2017.02); *B60J 1/2011* (2013.01); *B60Q 3/74* (2017.02); *G05D 1/0061* (2013.01); *B60Q 1/04* (2013.01); *B60Q 2300/314* (2013.01)

(58) Field of Classification Search
CPC ........ H05B 45/12; B60Q 1/323; B60Q 1/503; B60Q 1/24; B60Q 1/2665; B60Q 1/2669; B60Q 2400/40; B60Q 2400/50; B60Q 3/80; B60Q 3/74; B60Q 1/04; B60Q 2300/314; B60Q 1/1423; B60Q 1/076; F21S 43/255; F21S 8/00; F21W 2103/60; F21W 2107/10; F21Y 2113/13; F21Y 2115/10; F21V 23/003; B60J 1/2011; B60J 1/2016; G05D 1/0061
See application file for complete search history.

(56) References Cited

U.S. PATENT DOCUMENTS

2014/0375083 A1* 12/2014 Tejeda ...................... B60J 1/17
                                                      296/187.11
2015/0261219 A1*  9/2015 Cuddihy ................ B60J 1/2016
                                                          701/23
(Continued)

FOREIGN PATENT DOCUMENTS

CN       104908742 A    9/2015
EP         3369617 A1    9/2018
(Continued)

*Primary Examiner* — Renan Luque
(74) *Attorney, Agent, or Firm* — Dinsmore & Shohl LLP

(57) ABSTRACT

Provided is a vehicle illumination system, including: interior lighting provided in a vehicle that is operable in a manual driving mode and in an autonomous driving mode; a detection device, provided in the vehicle, that detects an ambient light level outside the vehicle; a first control unit, provided in the vehicle, that controls switching on and switching off of headlights on the basis of a detection result from the detection device; and a second control unit that controls an illumination level of the interior lighting, such that the illumination level of the interior light when the headlights have been switched on while the vehicle is in the autonomous driving mode is higher than the illumination level of the interior lighting when the headlights have been switched on while the vehicle is in the manual driving mode.

8 Claims, 8 Drawing Sheets

(51) Int. Cl.
B60J 1/20 (2006.01)
G05D 1/00 (2006.01)
B60Q 1/04 (2006.01)

(56) References Cited

U.S. PATENT DOCUMENTS

| | | | |
|---|---|---|---|
| 2018/0086259 A1* | 3/2018 | Bel | B60Q 3/16 |
| 2019/0033860 A1* | 1/2019 | Okimoto | G05D 1/0088 |
| 2019/0092170 A1* | 3/2019 | Gassman | B60R 11/0235 |
| 2020/0180436 A1* | 6/2020 | Obiagwu | B60K 35/00 |

FOREIGN PATENT DOCUMENTS

| | | |
|---|---|---|
| JP | 2000-159011 A | 6/2000 |
| JP | 2006-021591 A | 1/2006 |
| WO | 2017158771 A1 | 9/2017 |

* cited by examiner

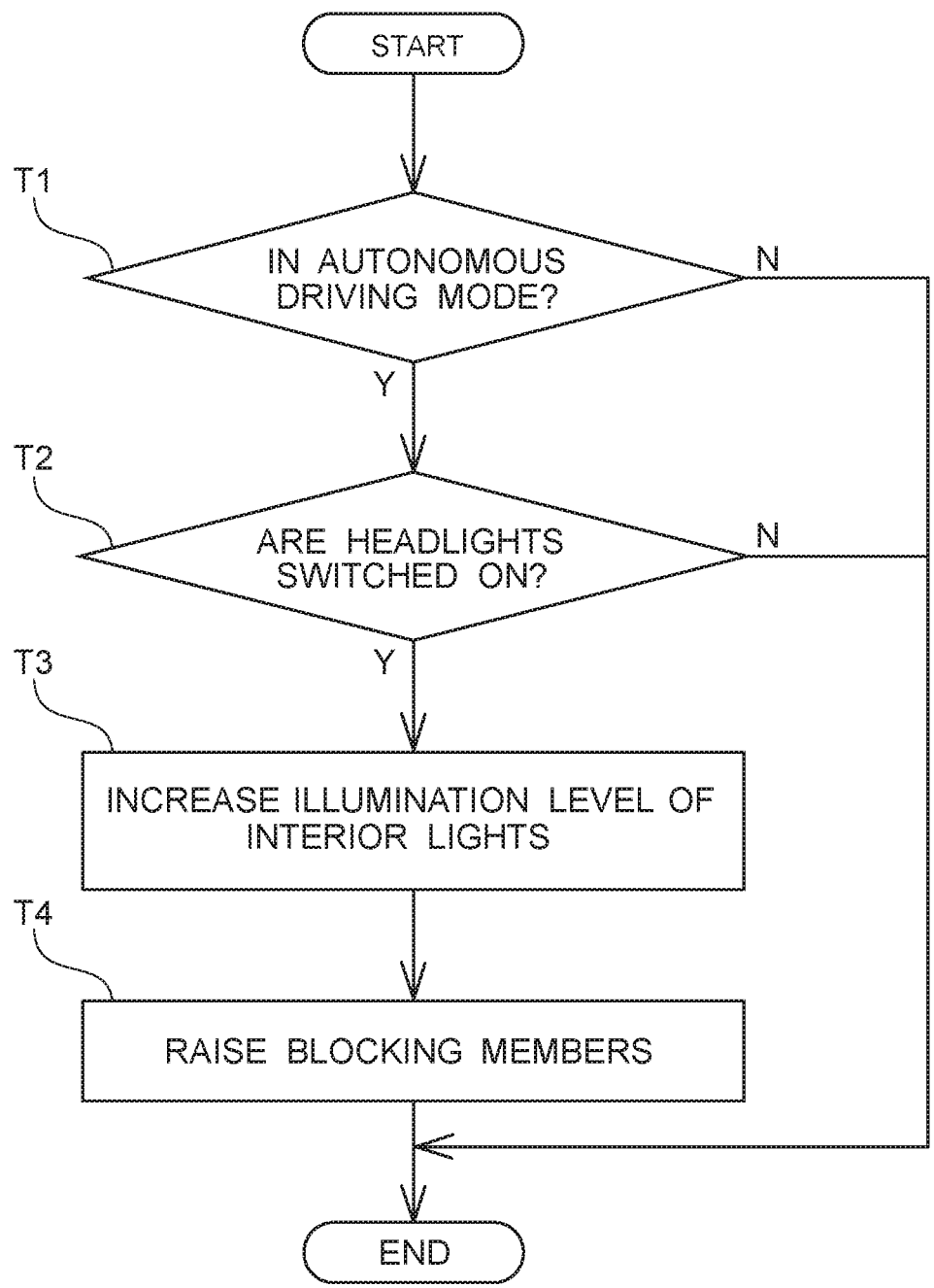

VEHICLE ILLUMINATION SYSTEM

CROSS-REFERENCE TO RELATED APPLICATION

This application is based on and claims priority under 35 USC 119 from Japanese Patent Application No. 2018-205670, filed on Oct. 31, 2018, the disclosure of which is incorporated by reference herein.

BACKGROUND

Technical Field

The present disclosure relates to a vehicle illumination system.

Related Art

Conventionally, there is known an illumination control system which, when it is darker outside a vehicle than a predetermined brightness, changes the illumination of in-vehicle instruments from a normal first brightness to a darker second brightness so that the front seat occupant does not experience the illumination of the in-vehicle instruments as a nuisance (e.g., see Japanese Patent Application Laid-open (JP-A) No. 2006-21591). The illumination control system detects the line of sight of the front seat occupant and, in regard to an in-vehicle instrument at which the line of sight is directed, changes the illumination from the second brightness to the first brightness to make it easier to see that in-vehicle instrument.

In the case of a vehicle capable of operating in an autonomous driving mode, while the vehicle is in the autonomous driving mode, occupants are free to engage in activities. For that reason, while the vehicle is in the autonomous driving mode, occupants have various preferences for passing the time comfortably in the cabin, such as playing a game or reading.

However, when it becomes dark outside the vehicle while the vehicle is in the autonomous driving mode, it also becomes dark inside the cabin and the occupants can no longer continue reading or doing other things. In this case, it is necessary to ensure the illumination level in the cabin by, for example, switching on the dome light (interior light) provided on the ceiling, but it is burdensome for the occupants to have to perform the operation of switching on the dome light.

In this way, in the case of a vehicle capable of operating in an autonomous driving mode, it is desired that the illumination level in the cabin be automatically controlled so that even when it becomes dark outside the vehicle while the vehicle is in the autonomous driving mode, the occupants can continue reading or doing other things.

SUMMARY

Therefore, the present disclosure provides a vehicle illumination system in which, when a vehicle capable of operating in an autonomous driving mode is in the autonomous driving mode, the illumination level of interior lighting is automatically adjusted so that the illumination level in the cabin is ensured even when it becomes dark outside the vehicle.

In order to achieve the above object, a vehicle illumination system of a first aspect of the disclosure includes: interior lighting provided in a vehicle that is operable in a manual driving mode and in an autonomous driving mode; a detection device, provided in the vehicle, that detects an ambient light level outside the vehicle; a first control unit, provided in the vehicle, that controls switching on and switching off of headlights on the basis of a detection result from the detection device; and a second control unit that controls an illumination level of the interior lighting, such that the illumination level of the interior light when the headlights have been switched on while the vehicle is in the autonomous driving mode is higher than the illumination level of the interior lighting when the headlights have been switched on while the vehicle is in the manual driving mode.

According to the first aspect of the disclosure, the first control unit controls the switching on and the switching off of the headlights on the basis of the detection result from the detection device that detects the ambient light level outside the vehicle. Additionally, the second control unit controls the illumination level of the interior lighting so that the illumination level of the interior lighting when the headlights have been switched on while the vehicle is in the autonomous driving mode becomes higher than the illumination level of the interior lighting when the headlights have been switched on while the vehicle is in the manual driving mode. That is, when it becomes dark outside the vehicle (such as when it becomes night or when the vehicle enters a tunnel) while the vehicle is in the autonomous driving mode, the headlights are switched on by the first control unit, and in accompaniment with the headlights being switched on, the illumination level of the interior lighting is adjusted by the second control unit so that the illumination level in the cabin is ensured. Thus, the occupant can continue reading or doing other things.

A vehicle illumination system of a second aspect of the disclosure is the vehicle illumination system of the first aspect, wherein: the interior lighting includes a dome light, and the second control unit increases the illumination level by switching on the dome light.

According to the second aspect of the disclosure, the second control unit increases the illumination level of the interior lighting by switching on the dome light. Consequently, ensuring the illumination level in the cabin can be easily accomplished.

A vehicle illumination system of a third aspect of the disclosure is the vehicle illumination system of the first or second aspect, further including: a blocking member that is provided, so as to be raisable and lowerable, at least at a cabin side of a door glass and that blocks the door glass when raised; and a third control unit that raises the blocking member when the headlights have been switched on while the vehicle is in the autonomous driving mode.

According to the third aspect of the disclosure, when the headlights have been switched on while the vehicle is in the autonomous driving mode, the third control unit raises the blocking members provided so as to be raisable and lowerable on the cabin side of at least the door glasses. Consequently, even when the illumination level of the interior lighting is adjusted so that the illumination level in the cabin is ensured, the light from the interior lighting can be inhibited from leaking through the door glasses to the outside of the vehicle.

As described above, according to the disclosure, when a vehicle capable of operating in an autonomous driving mode is in the autonomous driving mode, the illumination level of interior lighting is automatically adjusted so that the illumination level in the cabin can be ensured even when it becomes dark outside the vehicle.

BRIEF DESCRIPTION OF THE DRAWINGS

An exemplary embodiment of the present disclosure will be described in detail based on the following figures, wherein:

FIG. 8 is a flowchart showing the operation of the vehicle illumination system pertaining to the embodiment.

DETAILED DESCRIPTION

Figure 1:
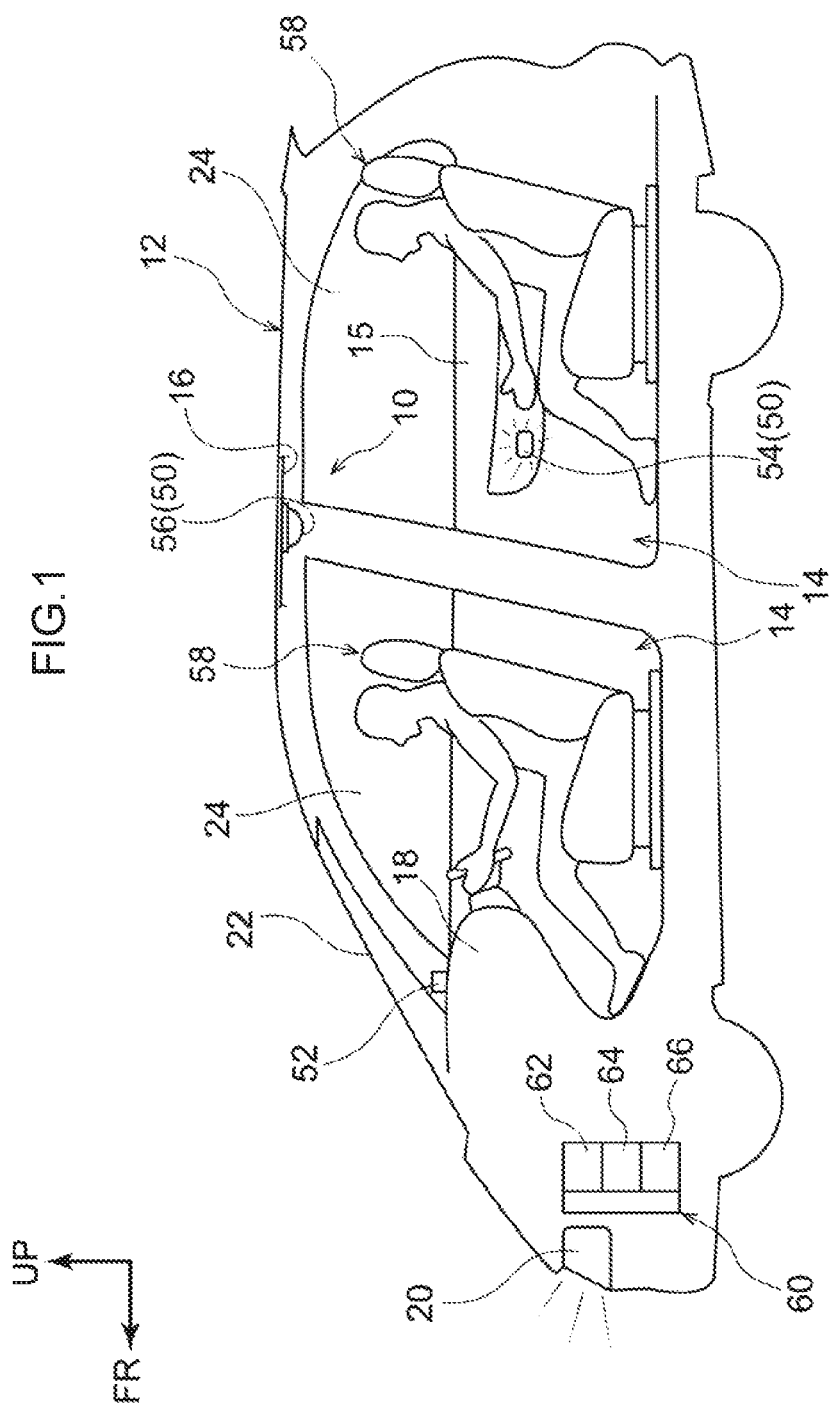
FIG. 1 is a side view showing a vehicle equipped with a vehicle illumination system pertaining to the embodiment operating in a manual driving mode at night.

An embodiment pertaining to the disclosure will be described in detail below based on the drawings. For convenience of description, arrow UP appropriately shown in the drawings indicates a vehicle upward direction, arrow FR indicates a vehicle forward direction, and arrow RH indicates a vehicle rightward direction. Consequently, when the directions of upper/lower, front/rear, and right/left are used without further specification in the following description, these will be understood to mean upper/lower in the vehicle up and down direction, front/rear in the vehicle front and rear direction, and right/left in the vehicle right and left direction (vehicle width direction).

Figure 2:
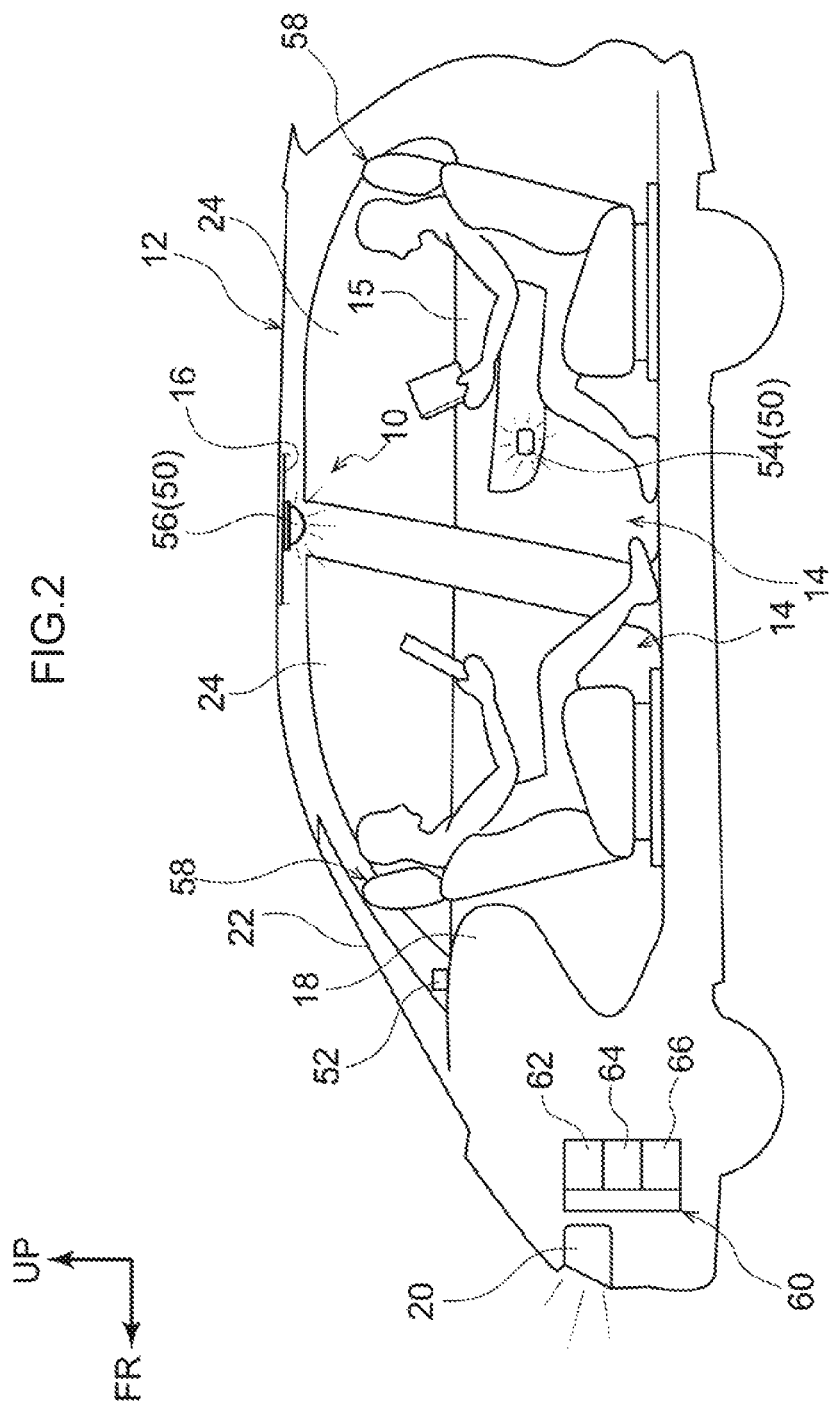
FIG. 2 is a side view showing the vehicle equipped with the vehicle illumination system pertaining to the embodiment operating in an autonomous driving mode at night.

As shown in FIG. 1 and FIG. 2, a vehicle 12 equipped with a vehicle illumination system 10 pertaining to the embodiment is configured to be capable of operating not only in a manual driving mode but also in an autonomous driving mode. Namely, the vehicle 12 is provided with a peripheral information detection system not shown in the drawings, and a control device 60, such as an electronic control unit, controls the traveling of the vehicle 12 on the basis of information obtained by the peripheral information detection system.

The vehicle 12 has front doors and rear doors (hereinafter called "side doors 14") that open and close openings for occupants to enter and exit the vehicle 12 (seats 58). The side doors 14 have door trims 15 provided with courtesy lights 54 whose illumination level is lower than that of a dome light 56. The dome light 56, whose illumination level is higher than that of the courtesy lights 54, is provided on a roof headlining 16 that configures the ceiling on the cabin side of the vehicle 12.

The dome light 56 is configured by plural light emitting diodes (LEDs) not shown in the drawings. The courtesy lights 54 are also configured by plural LEDs not shown in the drawings. As described later, the dome light 56 is configured in such a way that its illumination level is adjustable, but the courtesy lights 54 are configured in such a way that their illumination level is fixed (not adjustable).

The courtesy lights 54 are lights that are switched on by the control of a later-described second control unit 64 of the control device 60 when the side doors 14 are opened. However, in this vehicle 12, the courtesy lights 54 are configured to be switched on by the control of the second control unit 64 even in a state in which the side doors 14 are closed (in the manual driving mode and in the autonomous driving mode) when it is dark outside the vehicle 12 such as at night (when a later-described first control unit 62 of the control device 60 switches on headlights 20).

An ambient light level sensor 52 serving as a detection device that detects the ambient light level outside the vehicle 12 through a front windshield glass (hereinafter called a "front glass") 22 is provided on the upper portion of a dashboard 18 in the vehicle 12. The control device 60 has a first control unit 62, such as a first electronic control unit, that automatically switches on and automatically switches off the headlights 20 of the vehicle 12 on the basis of the detection result from the ambient light level sensor 52.

The control device 60 also has a second control unit 64, such as a second electronic control unit, that controls the illumination level of interior lighting 50 (lights in the cabin including the courtesy lights 54 and the dome light 56) so that, when the vehicle 12 is in the autonomous driving mode and the headlights 20 have been switched on, the illumination level of the interior lighting 50 becomes higher than it is when the vehicle 12 is in the manual driving mode and the headlights 20 have been switched on.

Specifically, when the vehicle 12 is in the manual driving mode and the headlights 20 have been switched on, the second control unit 64 of the control device 60 switches on just the courtesy lights 54. However, when the vehicle 12 is in the autonomous driving mode and the headlights 20 have been switched on, the second control unit 64 switches on not only the courtesy lights 54 but also the dome light 56. That is, the second control unit 64 increases the illumination level of the interior lighting 50 by switching on the dome light 56.

The dome light 56 switched on by the second control unit 64 is configured so that its illumination level can be changed as a result of being manually operated by an occupant. Namely, the dome light 56 has preset levels of illumination, such as "dark," "normal," and "bright," for example, and when the dome light 56 is switched on by the second control unit 64, it is switched on at the "normal" illumination level.

The dome light 56 switched on at "normal" by the second control unit 64 is configured so that its illumination level can be electrically changed from "normal" to the "dark" or "bright" illumination level as a result of an occupant manually operating switches (not shown in the drawings). Specifically, the "dark," "normal," and "bright" illumination levels of the dome light 56 are realized by changing the number of LEDs that are switched on.

Namely, the illumination level can be set to the "dark," "normal," and "bright" illumination levels by predetermining the number of LEDs that are switched on, such as 10, 20, and 30, for example. Furthermore, the dome light 56 is configured so that it can be switched on and switched off not only by the control of the second control unit 64 but also as a result of being manually operated by an occupant.

Figure 3:
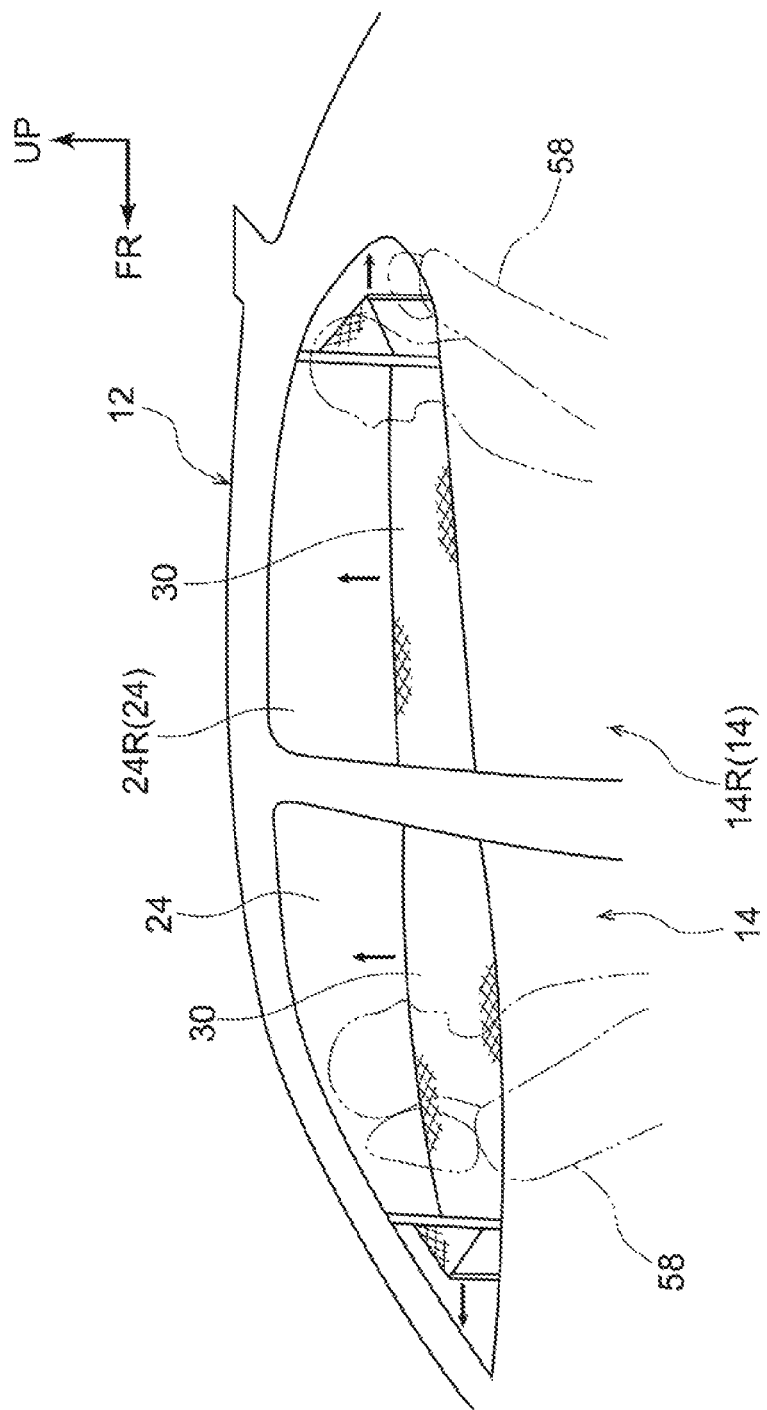
FIG. 3 is a side view showing blocking members being raised when the vehicle equipped with the vehicle illumination system pertaining to the embodiment is operating in the autonomous driving mode at night.
Figure 4:
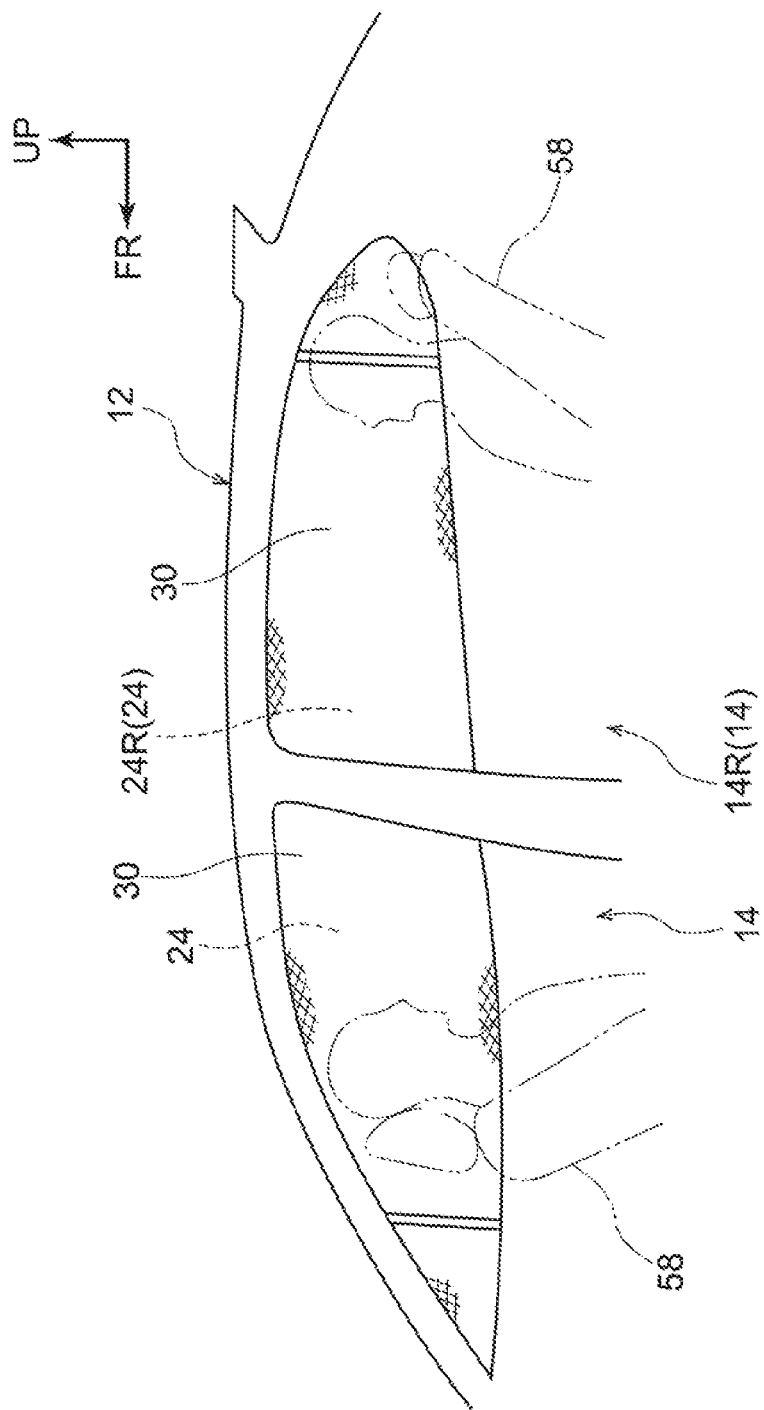
FIG. 4 is a side view showing the blocking members having been completely raised when the vehicle equipped with the vehicle illumination system pertaining to the embodiment is operating in the autonomous driving mode at night.
Figure 5:
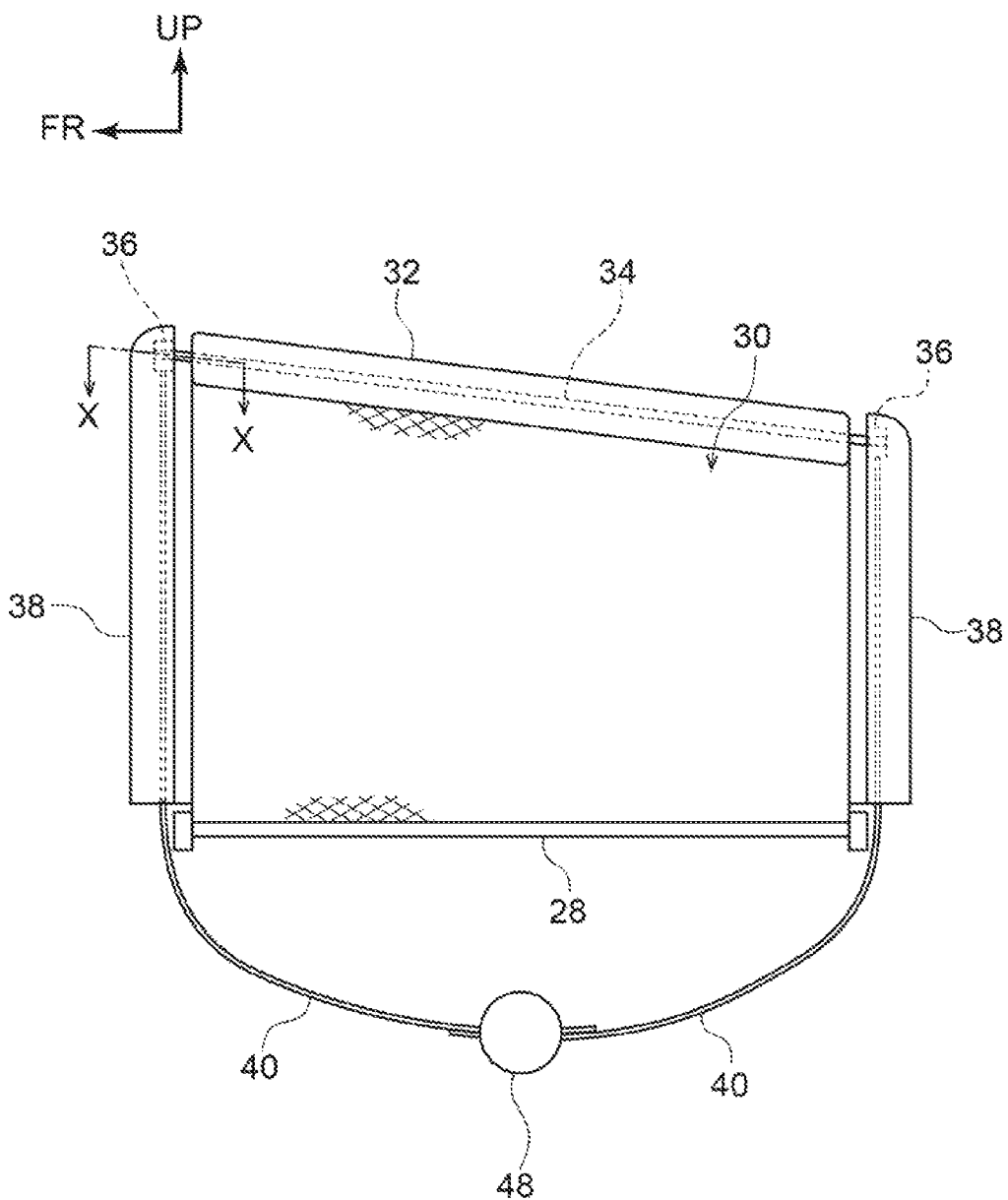
FIG. 5 is a configuration diagram showing a mechanism for raising and lowering the blocking members in the vehicle equipped with the vehicle illumination system pertaining to the embodiment.

As shown in FIG. 3 to FIG. 7, at least the side doors 14 are provided with blocking members 30 capable of blocking front door glasses and rear door glasses (hereinafter called "door glasses 24") from the cabin side. In FIG. 3 and FIG. 4, illustration of the dome light 56 is omitted. Furthermore, FIG. 5 shows a blocking member 30 provided on door glasses 24R (see FIG. 3 and FIG. 4) of rear side doors 14A that are rear doors.

The blocking members 30 are, for example, configured by flexible cloth screens. The control device 60 has a third control unit 66, such as a third electronic control unit, (see FIG. 1 and FIG. 2) that raises and lowers (deploys and stores) the blocking members 30. That is, because of the control of the third control unit 66 of the control device 60, the blocking members 30 are configured to adopt a raised (deployed) position in which they block the entire door glasses 24 and a lowered (stored) position in which they reveal the entire door glasses 24.

More specifically, as shown in FIG. 5, each blocking member 30 is configured in such a way that when storing (lowering) the blocking member 30 in the side door 14 the blocking member 30 is taken up on a take-up shaft 28 and when deploying (raising) the blocking member 30 over the door glass 24 the blocking member 30 is paid out from the take-up shaft 28. The take-up shaft 28 is urged in the take-up direction of the blocking member 30 by a spring not shown in the drawings, for example, and the blocking member 30 is taken up because of the urging force of the spring.

A blade 32 made of resin that extends in the front and rear direction is provided on the upper end portion of the blocking member 30. The blade 32 configures a frame of the blocking member 30. When the blocking member 30 is stored, the blade 32 also configures a cover that closes off an entrance/exit opening 26 (see FIG. 7) for the blocking member 30 in the side door 14.

A steel cord 34 serving as a reinforcement member is embedded inside the blade 32. Both end portions of the steel cord 34 project outward in the front and rear direction from the blade 32. Sliding members 36 are attached to both end portions of the steel cord 34 that project outward in the front and rear direction.

Figure 6:
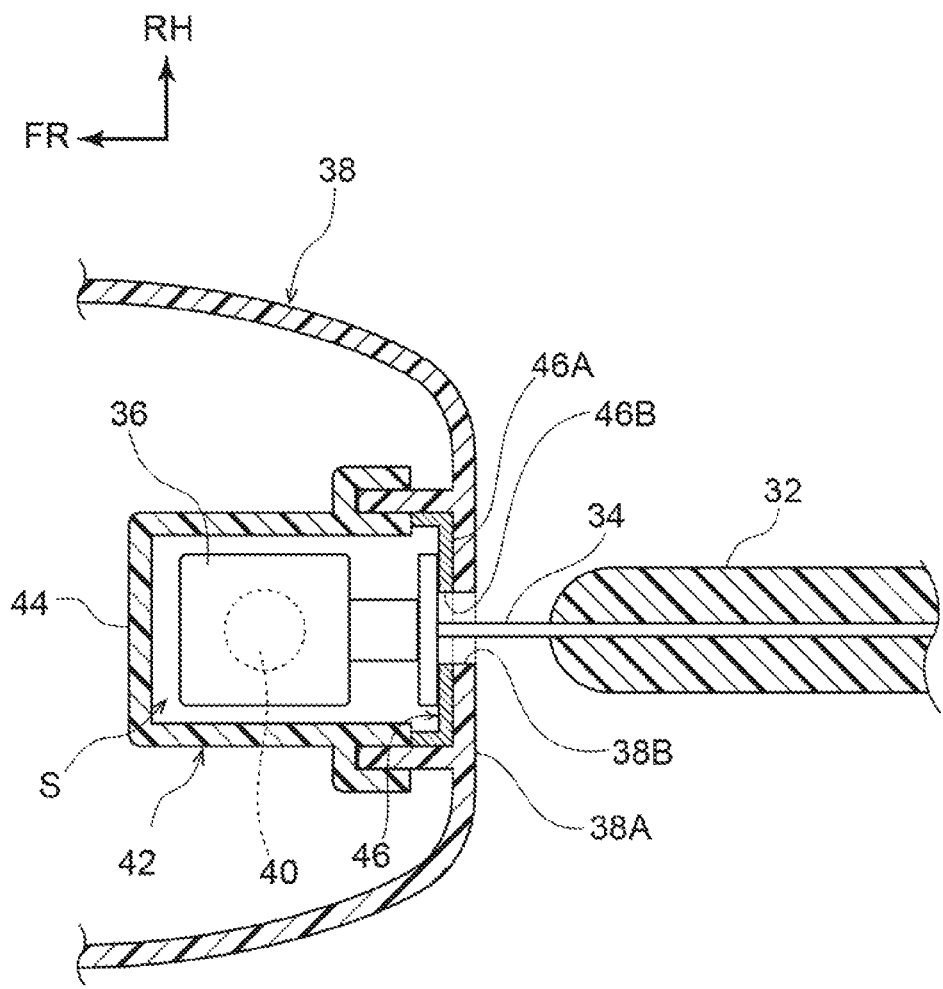
FIG. 6 is a sectional view, seen in the direction of the arrows indicated by line X-X in FIG. 5, showing the mechanism for raising and lowering the blocking members in the vehicle equipped with the vehicle illumination system pertaining to the embodiment.

As shown in FIG. 6, the sliding members 36 are configured to slide along rails 42 provided in a front and rear pair of pillars 38. The rails 42 are configured by attaching covers 44, which are substantially U-shaped in cross section, to inner surface sides of side wall portions 38A of the pillars 38. Spaces S through which the sliding members 36 are passed are formed inside the rails 42. Slits 38B that extend in the longitudinal direction of the rails 42 (the up and down direction) and through which the steel cord 34 is passed are formed in the side wall portions 38A.

Reinforcement members 46 made of metal are provided on the inner surfaces of the side wall portions 38A inside the rails 42. The reinforcement members 46 are substantially U-shaped in cross section, and slits 46B through which the steel cord 34 is passed are formed in side wall portions 46A of the reinforcement members 46. The positions of the slits 46B and the positions of the slits 38B coincide with each other, so that when the blocking member 30 becomes deployed and stored, the steel cord 34 moves inside the slits 38B, 46B.

As shown in FIG. 5, push-pull cables 40 are attached to the sliding members 36. The cables 40 are driven by the rotation of an electric motor 48. The cables 40 are pushed out when deploying the blocking member 30 and are pulled in when storing the blocking member 30.

Figure 7:
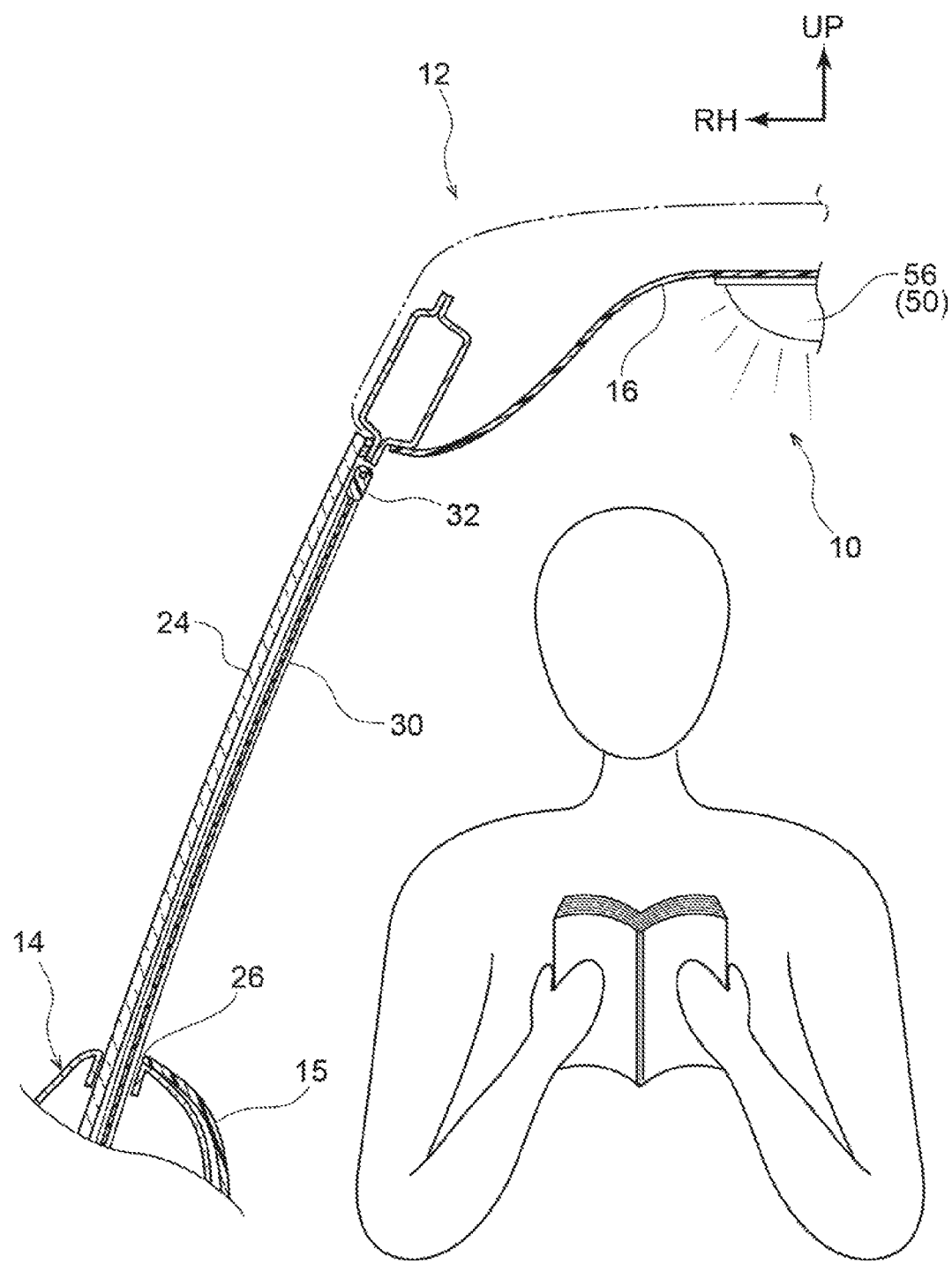
FIG. 7 is a front view showing the vehicle equipped with the vehicle illumination system pertaining to the embodiment operating in the autonomous driving mode at night.

That is, as shown in FIG. 7, when the vehicle 12 is in the autonomous driving mode and the headlights 20 have been switched on, or in other words when the dome light 56 has been switched on, the electric motor 48 is driven by the control of the third control unit 66 and the cables 40 are pushed out, whereby the blocking member 30 becomes raised (deployed) and blocks the door glass 24.

When the dome light 56 has been switched off, the electric motor 48 is driven to reversely rotate by the control of the third control unit 66 and the cables 40 are pulled in, whereby the blocking member 30 becomes lowered (stored) and reveals the door glass 24.

In this way, the blocking members 30 are automatically raised and lowered in conjunction with the switching on and switching off of the dome light 56. The electric motor 48 is configured to be driven also as a result of switches (not shown in the drawings) being operated by an occupant, so that the blocking members 30 can be raised and lowered also as a result of the switches being operated by the occupant, regardless of the dome light 56 being switched on and switched off.

Next, the action of the vehicle illumination system 10 having the above configuration will be described.

As shown in FIG. 1, when the vehicle 12 is in the manual driving mode at night, the first control unit 62 switches on the headlights 20 on the basis of the detection result from the ambient light level sensor 52. Additionally, the second control unit 64 switches on just the courtesy lights 54 provided in the door trims 15 of the side doors 14 as the interior lighting 50. That is, the dome light 56 provided on the roof headlining 16 remains switched off.

This is because if the dome light 56 is switched on at night, the cabin interior becomes reflected in the front glass 22 and it becomes difficult for the driver (front seat occupant) to see the dark outside through the front glass 22 from the bright cabin. This is also because there is the potential for the cabin interior to be visible to the outside of the vehicle 12 through the door glasses 24 and for an oncoming car or the like to be blinded by light leaking from the cabin through the door glasses 24 to the outside of the vehicle 12. For that reason, when the vehicle 12 is in the manual driving mode particularly at night, the dome light 56 is typically switched off.

Not just at night, when the vehicle 12 is in the autonomous driving mode, it is not necessary for the driver (front seat occupant) who had been driving in the manual driving mode to see outside through the front glass 22 from the cabin. For that reason, as shown in FIG. 2 for example, it becomes possible for the front seat occupant to rotate his/her seat 58 so as to face rearward and read or do other things like the rear seat occupant.

Here, when it is bright outside the vehicle 12, the cabin is also bright because of light that enters through the front glass 22 and the door glasses 24, so the occupants can read or do other things without switching on the dome light 56. However, when it becomes dark outside the vehicle 12, it also becomes dark in the cabin, so it is necessary to switch on the dome light 56 to read or do other things because just the light from the courtesy lights 54 is insufficient.

Therefore, next, the operation of the vehicle illumination system 10 will be described based on the flowchart shown in FIG. 8. Cases where it becomes dark outside the vehicle 12 can conceivably include not only a case where it has become night but also a case where the vehicle 12 has entered a tunnel. For that reason, here, it is judged that it has become dark outside the vehicle 12 when the first control unit 62 has switched on the headlights 20 on the basis of the detection result from the ambient light level sensor 52.

First, in step T1, it is judged whether or not the vehicle 12 is in the autonomous driving mode. If the vehicle 12 is in the autonomous driving mode, it is next judged in step T2 whether or not the headlights 20 are switched on. Then, in a case where the headlights 20 are switched on, it is judged that it is dark outside the vehicle 12, and the dome light 56 is switched on by the control of the second control unit 64.

Namely, the dome light 56 is switched on in addition to the courtesy lights 54. Consequently, as shown in step T3, the illumination level of the interior lighting 50 is increased as a result (the illumination level in the autonomous driving mode at night becomes higher than the illumination level in the manual driving mode at night in which only the courtesy lights 54 are switched on).

In this way, even if it becomes dark outside the vehicle 12 while the vehicle 12 is in the autonomous driving mode, the illumination level of the interior lighting 50 is automatically adjusted (increased) so that the illumination level in the cabin is ensured. Thus, the occupants can continue reading or doing other things in the cabin. Moreover, because the illumination level of the interior lighting 50 is increased (raised) as a result of the dome light 56 being switched on, ensuring the illumination level in the cabin can be easily accomplished.

Furthermore, when the illumination level of the interior lighting 50 is increased as a result of the dome light 56 being switched on, there is the potential for the cabin interior to be visible to the outside of the vehicle 12 through the door glasses 24 and for an oncoming car or the like to be blinded by light leaking from the cabin through the door glasses 24 to the outside of the vehicle 12. For that reason, as shown in step T4, in accompaniment with the dome light 56 being switched on, the blocking members 30 are raised by the control of the third control unit 66.

Specifically, the electric motors 48 are driven in conjunction with the dome light 56 being switched on and the cables 40 are pushed out, whereby the blocking members 30 are raised (deployed) and block the entire door glasses 24 from the cabin side. Because of this, a situation where the cabin interior is visible to the outside of the vehicle 12 through the door glasses 24 or where light leaks from the cabin through the door glasses 24 to the outside of the vehicle 12 can be inhibited or prevented.

The number of LEDs that are switched on in the dome light 56 that has been switched on by the control of the second control unit 64 can be changed as a result of the switch being manually operated by an occupant. Namely, the illumination level of the dome light 56 can, for example, be changed from "normal" to "bright" or "dark." In this way, the illumination level of the dome light 56 can be easily adjusted in accordance with the needs of the occupants.

Furthermore, when it becomes bright outside the vehicle 12, the ambient light level sensor 52 detects that, and the first control unit 62 switches off the headlights 20 on the basis of the detection result. Then, in accompaniment with the headlights 20 being switched off, the second control unit 64 switches off the dome light 56. Additionally, in accompaniment with the dome light 56 being switched off, the third control unit 66 lowers (stores) the blocking members 30.

In this way, according to the vehicle illumination system 10 pertaining to the embodiment, while the vehicle 12 is in the autonomous driving mode, the illumination level in the cabin can be automatically and appropriately ensured and leakage of light from the cabin to the outside of the vehicle 12 particularly at night can be inhibited or prevented. Consequently, while the vehicle 12 is in the autonomous driving mode, the occupants can pass the time comfortably in the cabin.

The vehicle illumination system 10 pertaining to the embodiment has been described above based on the drawings, but the vehicle illumination system 10 pertaining to the embodiment is not limited to what is shown in the drawings and can undergo appropriate design changes in a range that does not depart from the spirit of the disclosure.

For example, the blocking member 30 may also be provided on the cabin side of the rear glass (not shown in the drawings), and may also be deployed by an occupant lifting up the blade 32. Furthermore, the ambient light level sensor 52 may also be provided on the upper portion of the center of the inner surface (the surface on the cabin side) of the front glass 22, for example.

Moreover, in the embodiment, the first control unit 62, the second control unit 64, and the third control unit 66 are incorporated into the control device 60 (for autonomous driving) that controls the traveling of the vehicle 12, but the first control unit 62, the second control unit 64, and the third control unit 66 are not limited to this configuration. The first control unit 62, the second control unit 64, and the third control unit 66 may also be provided separately from the control device 60. Furthermore, a control device (not shown in the drawings) different from the control device 60 may also be configured by just the first control unit 62, the second control unit 64, and the third control unit 66.

What is claimed is:

1. A vehicle illumination system, comprising:
    interior lighting provided in a vehicle that is operable in a manual driving mode and in an autonomous driving mode, the interior lighting includes a dome light;
    a detection device, provided in the vehicle, that detects an ambient light level outside the vehicle;
    a first control unit, provided in the vehicle, that controls switching on and switching off of headlights on the basis of a detection result from the detection device; and
    a second control unit that controls an illumination level of the interior lighting, such that the illumination level of the interior light when the headlights have been switched on while the vehicle is in the autonomous driving mode is higher than the illumination level of the interior lighting when the headlights have been switched on while the vehicle is in the manual driving mode;
    a blocking member that is provided, so as to be raisable and lowerable, at least at a cabin side of a door glass and that blocks the door glass when raised; and
    a third control unit that raises the blocking member when the headlights have been switched on while the vehicle is in the autonomous driving mode and the dome light is switched on.

2. The vehicle illumination system according to claim 1, wherein:
    the second control unit increases the illumination level by switching on the dome light.

3. The vehicle illumination system according to claim 1, wherein:
    the interior lighting includes a courtesy light, and
    the second control unit:
        switches on only the courtesy light when the vehicle is in the manual driving mode and the headlights have been switched on, and switches on the courtesy light and also the dome light when the vehicle is in the autonomous driving mode and the headlights have been switched on.

4. The vehicle illumination system according to claim 1, wherein the third control unit is configured to raise and lower the blocking member so that the blocking member adopts a raised position in which the blocking member blocks the entire door glass and a lowered position in which the blocking member reveals the entire door glass.

5. A vehicle illumination system, comprising:
   interior lighting provided in a vehicle that is operable in a manual driving mode and in an autonomous driving mode, the interior lighting includes a courtesy light and a dome light;
   a detection device, provided in the vehicle, that detects an ambient light level outside the vehicle;
   a first control unit, provided in the vehicle, that controls switching on and switching off of headlights on the basis of a detection result from the detection device; and
   a second control unit that controls an illumination level of the interior lighting, such that the illumination level of the interior light when the headlights have been switched on while the vehicle is in the autonomous driving mode is higher than the illumination level of the interior lighting when the headlights have been switched on while the vehicle is in the manual driving mode, the second control unit:
   switches on only the courtesy light when the vehicle is in the manual driving mode and the headlights have been switched on, and
   switches on the courtesy light and also the dome light when the vehicle is in the autonomous driving mode and the headlights have been switched on.

6. The vehicle illumination system according to claim 5, wherein:
   the second control unit increases the illumination level by switching on the dome light.

7. The vehicle illumination system according to claim 5, further comprising:
   a blocking member that is provided, so as to be raisable and lowerable, at least at a cabin side of a door glass and that blocks the door glass when raised; and
   a third control unit that raises the blocking member when the headlights have been switched on while the vehicle is in the autonomous driving mode.

8. The vehicle illumination system according to claim 7, wherein the third control unit is configured to raise and lower the blocking member so that the blocking member adopts a raised position in which the blocking member blocks the entire door glass and a lowered position in which the blocking member reveals the entire door glass.

* * * * *